United States Patent
Basulto et al.

(10) Patent No.: US 9,910,419 B2
(45) Date of Patent: Mar. 6, 2018

(54) SYSTEM AND METHOD OF SYNCHRONIZING TIME BETWEEN MULTIPLE SYSTEMS

(71) Applicant: Harnischfeger Technologies, Inc., Wilmington, DE (US)

(72) Inventors: Jorge A. Basulto, Oconomowoc, WI (US); Charles D. Payne, Mukwonago, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 1214 days.

(21) Appl. No.: 14/021,287

(22) Filed: Sep. 9, 2013

(65) Prior Publication Data

US 2015/0073571 A1   Mar. 12, 2015

(51) Int. Cl.
| | |
|---|---|
| *G06F 1/12* | (2006.01) |
| *G06F 1/00* | (2006.01) |
| *G05B 19/42* | (2006.01) |
| *G05B 19/05* | (2006.01) |

(Continued)

(52) U.S. Cl.
CPC .... *G05B 19/05* (2013.01); *G05B 2219/15063* (2013.01); *G06F 1/08* (2013.01); *G06F 1/10* (2013.01)

(58) Field of Classification Search
CPC .................. G06F 1/12; G06F 1/10; G06F 1/08
See application file for complete search history.

(56) References Cited

U.S. PATENT DOCUMENTS

| | | |
|---|---|---|
| 4,709,347 A | 11/1987 | Kirk |
| 5,579,513 A | 11/1996 | Strohmet |
| 6,914,914 B1 | 7/2005 | Flood et al. |

(Continued)

FOREIGN PATENT DOCUMENTS

| | | |
|---|---|---|
| CN | 102830611 | 12/2012 |
| CN | 103580768 | 2/2014 |

(Continued)

OTHER PUBLICATIONS

Mills, D., Simple Network Time Protocol (Aug. 1992) 10 pages.

(Continued)

*Primary Examiner* — Phil Nguyen
(74) *Attorney, Agent, or Firm* — Michael Best & Friedrich LLP (57) ABSTRACT

Systems and methods for synchronizing time between multiple systems on a mining machine. The system includes a programmable logic controller (PLC) for controlling the mining machine and for transmitting a time to synchronize computer subsystems on the machine. The PLC includes a system clock that is programmed to operate on local time. A battery pack is connected to the PLC to allow the system clock to function continuously, even when the machine is turned off. Computer subsystems request and receive time updates from the PLC. A local time on each computer subsystem is determined based on the time update received from the PLC. Each computer subsystem includes a time zone parameter set to Coordinated Universal Time (UTC) and a Daylight Saving Time (DST) parameter that is disabled. Accordingly, the local time on each computer subsystem is set to the time update value received from the PLC.

16 Claims, 8 Drawing Sheets

(51) Int. Cl.
*G06F 1/08* (2006.01)
*G06F 1/10* (2006.01)

(56) References Cited

U.S. PATENT DOCUMENTS

| | | | |
|---|---|---|---|
| 7,111,183 B1* | 9/2006 | Klein | G06F 1/26 |
| | | | 713/1 |
| 7,356,036 B2 | 4/2008 | Van Der Valk et al. | |
| 7,457,322 B1 | 11/2008 | Flood et al. | |
| 7,613,164 B2 | 11/2009 | Chunxu et al. | |
| 7,656,751 B2 | 2/2010 | Rischar et al. | |
| 2002/0033833 A1 | 3/2002 | Kinugawa et al. | |
| 2003/0214936 A1* | 11/2003 | Goff | H04B 7/2693 |
| | | | 370/350 |
| 2003/0233553 A1* | 12/2003 | Parks | G06F 21/725 |
| | | | 713/178 |
| 2004/0022131 A1* | 2/2004 | Kibiloski | G04C 10/04 |
| | | | 368/47 |
| 2004/0028162 A1* | 2/2004 | Skahan, Jr. | G06F 1/14 |
| | | | 375/356 |
| 2004/0156163 A1* | 8/2004 | Nerheim | F41C 3/00 |
| | | | 361/232 |
| 2005/0124306 A1 | 6/2005 | Cheng | |
| 2005/0286349 A1* | 12/2005 | Cook | G04R 20/26 |
| | | | 368/47 |
| 2006/0239123 A1* | 10/2006 | Chen | G04G 9/0076 |
| | | | 368/21 |
| 2007/0159924 A1* | 7/2007 | Vook | G01S 5/28 |
| | | | 367/127 |
| 2007/0206442 A1 | 9/2007 | Kim | |
| 2007/0253533 A1 | 11/2007 | Soukal | |
| 2009/0016475 A1 | 1/2009 | Rischar et al. | |
| 2012/0179739 A1 | 7/2012 | Ji et al. | |
| 2012/0294318 A1* | 11/2012 | Fang | H04J 3/0664 |
| | | | 370/503 |

FOREIGN PATENT DOCUMENTS

| | | |
|---|---|---|
| EP | 1441077 | 7/2004 |
| EP | 1833007 | 9/2007 |
| ES | 2537834 | 6/2015 |
| JP | 2002157005 | 5/2002 |
| JP | 2007101306 | 4/2007 |
| RU | 2267811 | 1/2006 |
| WO | 1998014842 | 4/1998 |
| WO | 2001095550 | 12/2001 |

OTHER PUBLICATIONS

First Office Action from the Chilean Intellectual Property Office for Application No. 2378-2014, dated Jun. 10, 2016, (7 pages, which includes English Statement of Relevance).

TK2014/10469 Turkish Search Report dated Jul. 12, 2017 (4 pages, which includes a Statement of Relevance).

Office Action and Search Report from the Columbia Patent Office for Application No. 14-197.868 dated Jun. 29, 2017 (19 pages).

* cited by examiner

SYSTEM AND METHOD OF SYNCHRONIZING TIME BETWEEN MULTIPLE SYSTEMS

FIELD

Embodiments of the invention relate to synchronizing time between multiple systems on a local area network.

BACKGROUND

Various industrial machines, including mining machines, are used to meet tasks and challenges in industry today. For example, mining machines as used herein include, but are not limited to, shovels, hybrid shovels, blast hole drills, draglines, wheel loaders and dozers, conveyor systems, and feeder-breakers.

SUMMARY

Industrial and mining machines have become more sophisticated and may include various hardware and software components to control and monitor the machines. Monitoring such machines may involve data collection across various systems and subsystems and may involve time stamping at both the system level and the subsystem level. In some systems, data loss and other issues occur from an inability to maintain proper settings for time zone and daylight savings on each subsystem of an industrial or mining machine.

In some embodiments, the invention provides systems and methods for synchronizing clocks of multiple systems on a machine in a manner designed to reduce or overcome problems with the prior art. For instance, subsystems of a machine synchronize their clocks to one source without having to rely on their own on-board subsystem parameters. Additionally, a programmable logic controller (PLC) on the machine serves as a master clock for subsystems of the machine. Thus, time zone parameters and Daylight Saving Time (DST) parameters only need to be updated on the PLC rather than on every subsystem of the machine. Furthermore, the parameters of the PLC are programmable rather than hard-coded. Thus, the parameters are easier to adjust.

The machine may also include a battery pack to allow the PLC's clock to remain operational for several months or longer to prevent DST problems caused by re-booting subsystems with out-of-date parameters. Thus, subsystems of the machine maintain accurate time stamps without synchronizing to a remote server and without making their own calculations using their own time zone and DST parameters. In some embodiments of the invention, an additional device receives time information from a remote time source and transmits the time information to the PLC. Additionally, embodiments of the invention eliminate Simple Network Time Protocol (SNTP) server stability and accuracy issues by treating the PLC as an SNTP server. In some instances, the PLC clock operates independent of external time sources and instead relies on its own internal clock and programmable parameters.

In one embodiment, the invention provides an industrial machine, such as a mining machine, comprising: a programmable logic controller (PLC) and a computer subsystem. The PLC includes a PLC system clock having a local time, the local time being a time of an area in which the industrial machine is located, the area being outside of the Coordinated Universal Time (UTC) time zone. The PLC is operable to control an industrial function of the industrial machine. For example, the PLC is operable to control mining functions of a mining machine, such as a digging, drilling, dumping, crushing, conveying function, etc., by receiving operator input and, in response, controlling shovels, drills, conveyors and/or other equipment of the mining machine. The PLC is also operable to transmit the local time masked as a UTC time value. The computer subsystem has a local time clock with a configurable time zone parameter that is set to the UTC time zone and a Daylight Saving Time (DST) parameter set to ignore DST. The computer subsystem receives the local time transmitted by the PLC, and the local time clock is set to the received local time from the PLC.

In another embodiment, the invention provides a method of synchronizing time between multiple systems on an industrial machine, such as a mining machine. The method includes setting a programmable logic controller (PLC) system clock of a PLC to a local time, the local time being a time of an area in which the industrial machine is located, the area being outside of the Coordinated Universal Time (UTC) time zone. The method further includes setting a time zone parameter of a computer subsystem of the industrial machine to the UTC time zone and setting a Daylight Saving Time (DST) parameter of the computer subsystem to ignore DST. Thereafter, the PLC receives a UTC time update request from the computer subsystem. The method further includes sending a current time value of the PLC system clock to the computer subsystem masked as a UTC time value in response to receiving the UTC time update request; and setting a clock of the computer subsystem to the current time value of the PLC system clock.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

Figure 1A:
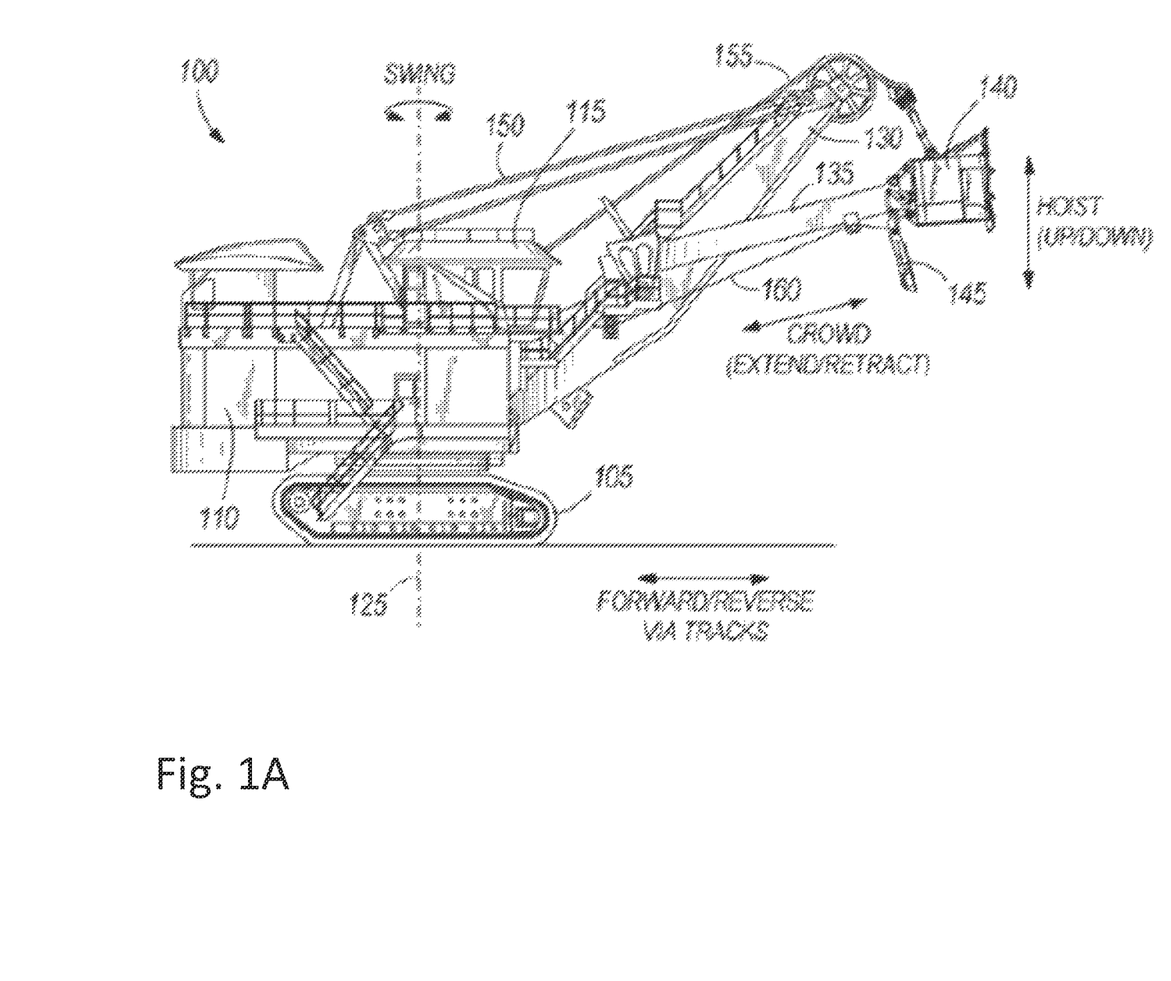
FIG. 1A illustrates a mining shovel that may incorporate embodiments of the invention.

FIG. 1A illustrates an electric mining rope shovel 100, herein referred to as shovel 100. The shovel 100 includes tracks 105 for propelling the shovel 100 forward and backward, and for turning the shovel 100 (i.e., by varying the speed and/or direction of the left and right tracks relative to each other). The tracks 105 support a base 110 including a cab 115. The base 110 is able to swing or swivel about a swing axis 125, for instance, to move from a digging location to a dumping location. Movement of the tracks 105 is not necessary for the swing motion. The shovel 100 further includes a dipper shaft 130 supporting a pivotable dipper handle 135 (handle 135) and dipper 140. The dipper 140 includes a door 145 for dumping contents from within the dipper 140 into a dump location, such as a hopper or dump-truck.

The shovel 100 also includes taut suspension cables 150 coupled between the base 110 and dipper shaft 130 for supporting the dipper shaft 130; a hoist cable 155 attached to a winch (not shown) within the base 110 for winding the cable 155 to raise and lower the dipper 140; and a dipper door cable 160 attached to another winch (not shown) for opening the door 145 of the dipper 140. In some instances, the shovel 100 is a P & H® 4100 series shovel produced by P & H Mining Equipment Inc., although the shovel 100 can be another type or model of electric mining equipment.

Figure 1B:
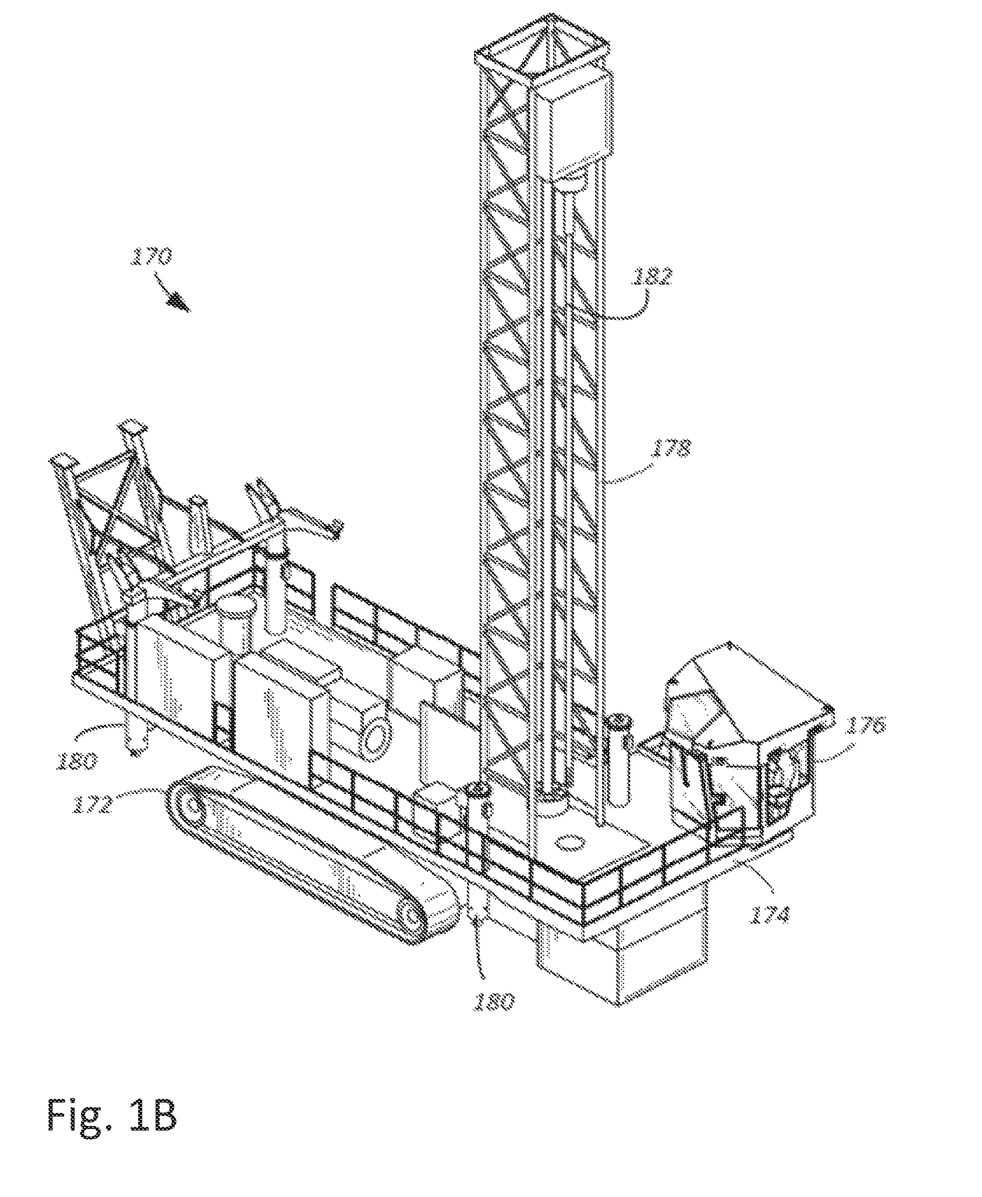
FIG. 1B illustrates a mining drill that may incorporate embodiments of the invention.

FIG. 1B illustrates an electric mining drill 170 (the "drill 170"). In some embodiments, the drill 170 is a blast hole drill, such as a 320 XPC drill or another Centurion®-based drill manufactured by Job Global, Inc.

The drill 170 includes tracks 172 for propelling the drill 170 forward and backward, and for turning the drill 170 (i.e., by varying the speed and/or direction of the left and right tracks relative to each other). The tracks 172 support a platform 174 including a cab 176 and a mast 178. The platform 174 includes four jacks 180 that may be selectively raised and lowered via a hydraulic system. When lowered and set, the four jacks 180 prevent movement of the drill 170 for drilling. The mast 178 supports a drill bit 182 that is rotationally driven and selectively raised and lowered to bore into an area below the platform 174.

Figure 2:
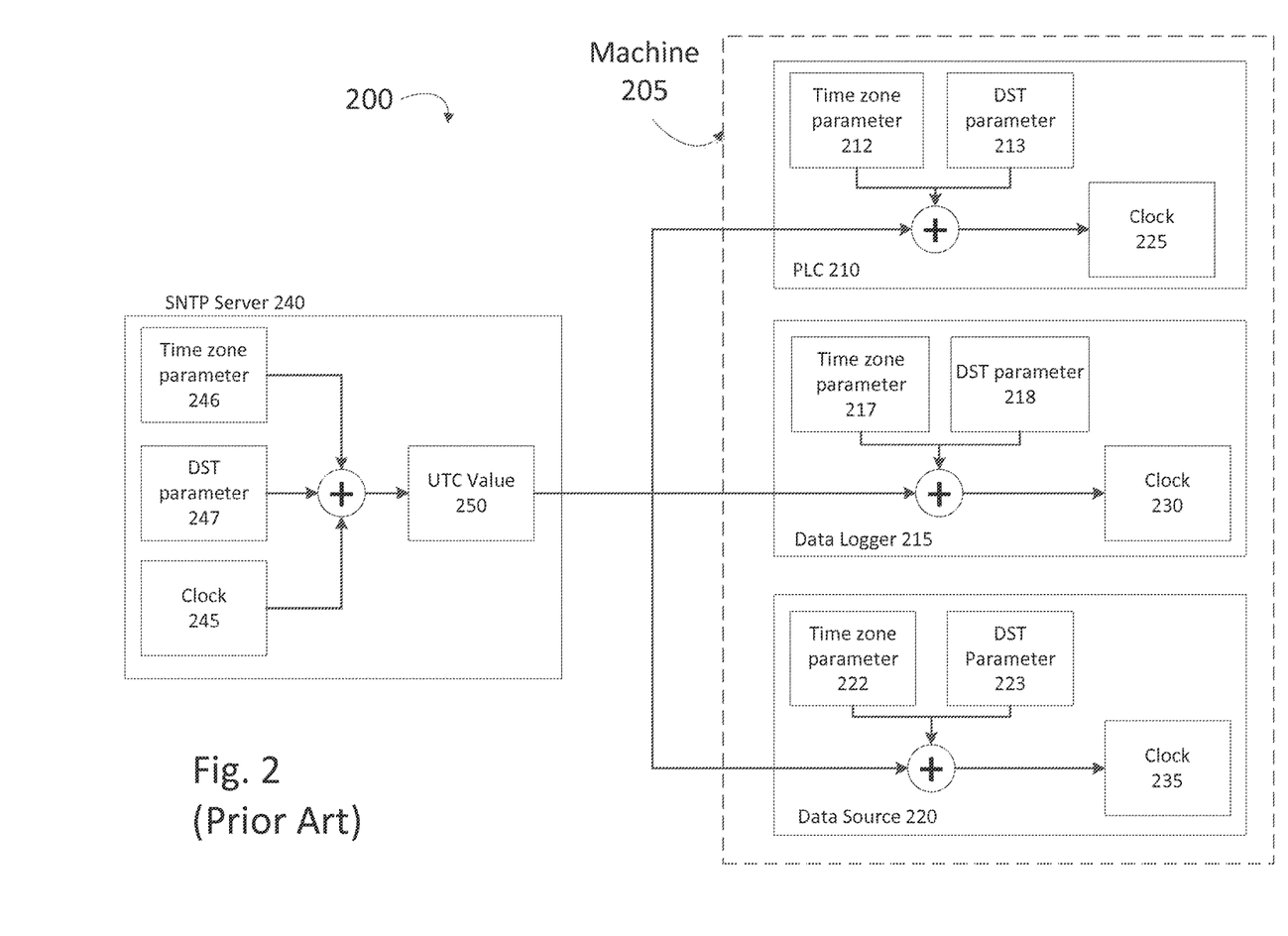
FIG. 2 illustrates a prior art system that uses Simple Network Time Protocol (SNTP) to synchronize the clocks of numerous subsystems on a mining machine.

FIG. 2 illustrates a prior art system 200 located on a machine 205 such as the shovel 100 or the drill 170. The subsystems of the machine 205 include, for instance, a programmable logic controller (PLC) 210, a data logger 215, and a data source 220 (e.g., a sensor).

In the prior art system shown in FIG. 2, the PLC 210 is connected to at least one other subsystem on the machine 205 and includes software that makes control decisions for operation of the machine 205. The data logger 215 is connected to at least one other subsystem on the machine 205 and aggregates data collected by data source 220 and additional subsystems (not pictured). The subsystems are connected to each other using a local area network (LAN) (not pictured). The PLC 210 includes a PLC clock 225. Data logger 215 includes a data logger clock 230, and data source 220 includes a data source clock 235. The subsystem clocks can be used to time stamp data.

Each subsystem also includes its own time zone parameter and Daylight Saving Time (DST) parameter. The PLC 215 includes a PLC time zone parameter 212 and a PLC DST parameter 213. The data logger 215 includes a data logger time zone parameter 217 and a data logger DST parameter 218. The data source 220 includes a data source time zone parameter 222 and a data source DST parameter 223.

The data logger 215 receives data that was time stamped by the subsystem that collected the data. Additionally, the data logger 215 time stamps data when data is received. The data logger 215 can compare its own time stamp with the time stamp generated by the subsystem. If the time stamps are not within a specified range, the data is assumed to be corrupt and is discarded. Furthermore, the data logger 215 can compare the time stamps for data generated by multiple subsystems in order to synchronize data collected from multiple sources on the machine 205.

The system 200 uses Simple Network Time Protocol (SNTP) to synchronize the clocks of the numerous subsystems of the machine 205. SNTP utilizes a server-client relationship where SNTP clients periodically request time updates from an SNTP server. An SNTP server 240 is located remotely from the machine 205 and often is located in a different time zone and/or country than the machine 205. The SNTP server 240 includes a SNTP server clock 245, a SNTP server time zone parameter 246, and a SNTP server Daylight Saving Time (DST) parameter 247. The SNTP server 240 takes a local time from the SNTP server clock 245 and calculates Coordinated Universal Time (UTC) value 250 using time zone parameter 246 and DST parameter 247. The SNTP server 240 can then transmit UTC value 250 to requesting subsystems.

In general, UTC is a time standard that is used to regulate clocks and time. The UTC value represents the time in the UTC time zone, which includes Greenwich, England. When clocks or systems receive a UTC value, the UTC value is adjusted using local DST and time zone information. For example, a device located in a time zone five hours ahead of the UTC time zone would add five hours to the received UTC value. In a similar manner, devices providing UTC values (i.e., SNTP servers) perform a reverse calculation. For example, a device located in a time zone five hours ahead of the UTC time zone would subtract five hours from its local time and then send the UTC value to a requesting device.

Figure 3:
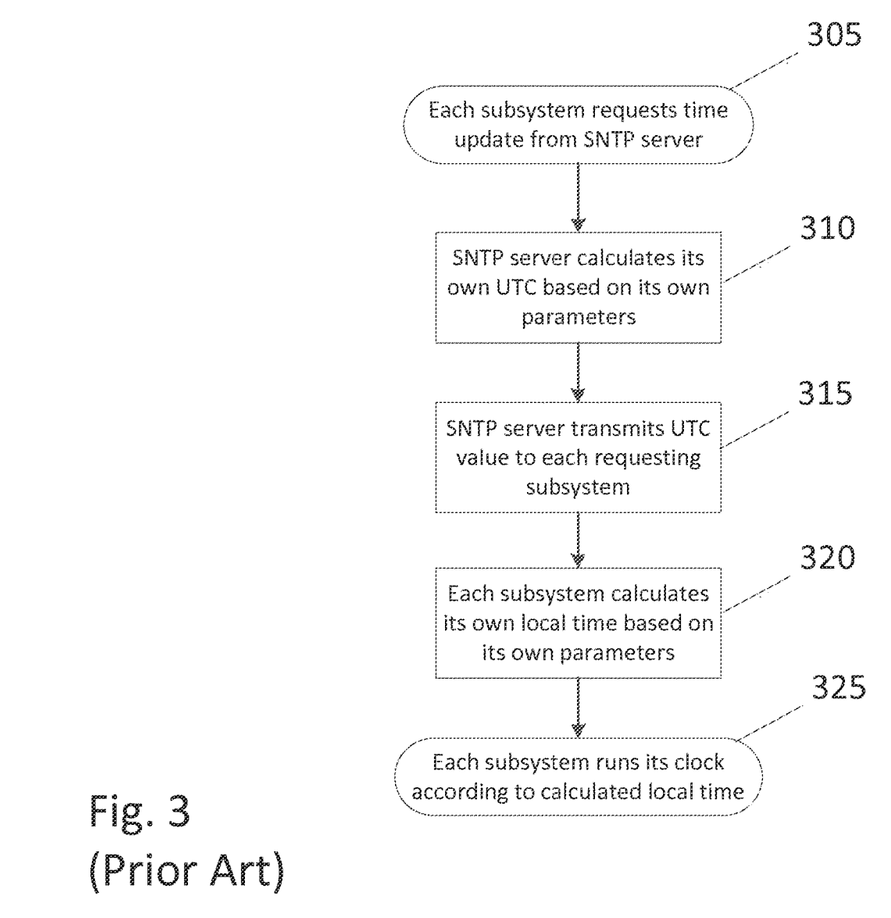
FIG. 3 illustrates a block diagram of the prior art process executed by the system of FIG. 2 to synchronize the clocks of the subsystems of the mining machine.

FIG. 3 illustrates a block diagram of the prior art process executed by the system 200 of FIG. 2 to synchronize the clocks of the subsystems of the machine 205. Each subsystem of the machine 205 acts as an SNTP client and periodically requests time updates from an SNTP server 240 (step 305). Upon receiving a time update request, the SNTP server 240 calculates UTC value 250 based on its local time from the SNTP server clock in combination with the SNTP server time zone parameter 246 and the SNTP server DST parameter 247 (step 310). The SNTP server 240 then transmits the UTC value 250 back to the subsystem that requested the time update (step 315). Each subsystem must use its own hard-coded, on-board time zone parameters and DST parameters to calculate its local time (step 320). Each subsystem runs its clock according to the calculated updated local time (325).

According to the time synchronization system and method utilized in FIGS. 2 and 3, the SNTP server 240 serves as the master clock for the system 200, meaning that other clocks in the system 200 synchronize based on information received from the SNTP server 240. Even though the SNTP server 240 is the master clock, each subsystem must calculate its own local time to use for its own clock. Thus, time synchronization between subsystems is prevented if the on-board parameters for each subsystem are not up-to-date and consistent with other subsystems on the machine 205.

Accordingly, SNTP has shortcomings when applied to a small LAN where devices do not have continuous access to the Internet, such as the small LAN that can be used on mining machines or other industrial machines. SNTP depends on each client having up-to-date parameters for when a particular time zone begins and ends DST. However, the current time zone and applicable DST rules for a particular machine 205 can change due to movement of the machine 205 or alterations in DST rules by different governing bodies.

Furthermore, subsystems may use an operating system that cannot be changed or configured by a user, or they may have time zone and DST parameters that are hard-coded. Thus, subsystem parameters can be difficult to adjust or cannot be adjusted at all. Additionally, the subsystems do not continue to function when the machine 205 is turned off. Even when updates are made to subsystem parameters, subsystems cannot retain knowledge that the update was made once they are turned off. Accordingly, each time the machine 205 is powered on, subsystems may use outdated DST information to add or subtract an hour even though the subsystems were previously updated. This issue has been referred to as "DST Amnesia."

Furthermore, SNTP service software periodically has stability problems. If the SNTP server stops operating, subsystems acting as SNTP clients are unable to synchronize their clocks. Additionally, some SNTP servers have accuracy issues due to different central processing unit (CPU) chips. Some SNTP servers can lose time at a rate of almost one second per minute. This inaccuracy is unacceptable for subsystems of machines that require accurate time synchronization. Consequently, the system and method shown in FIGS. 2 and 3 do not adequately ensure that clocks on the subsystems of a mining machine are accurate and consistent.

Figure 4:
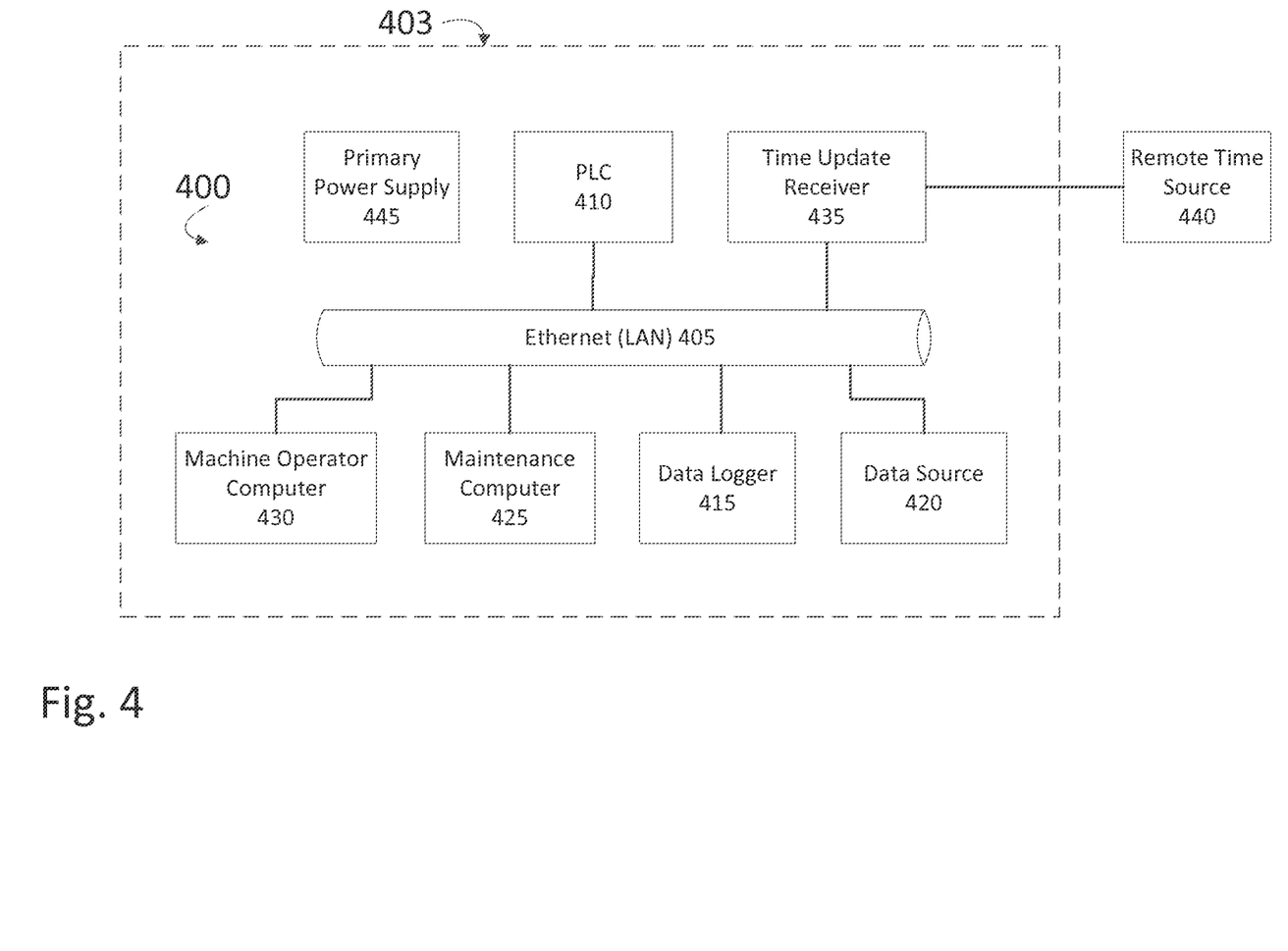
FIG. 4 illustrates an improved time synchronization system on a mining machine.

FIG. 4 illustrates an improved time synchronization system 400 for use on machine 403, such as the shovel 100, the drill 170, a hybrid shovel, dragline, wheel loaders and dozers, conveyor systems, feeder-breakers, or another mining or industrial machine. The subsystems of the machine 403 can communicate with each other via an Ethernet LAN 405. The subsystems of the machine 403 include a programmable logic controller (PLC) 410, a data logger 415, a data source 420 (e.g., a sensor), a maintenance computer 425, a machine operator computer 430, and a time update receiver 435. The PLC 410 includes software that makes control decisions for operation of the machine 403 (e.g., based on operator commands, stored parameters, sensor data, etc.). The data logger 415 aggregates data collected by data source 420 and additional subsystems. The maintenance computer 425 allows qualified maintenance personnel to make adjustments to the system 400. The machine operator computer 430 allows an operator to control the machine 403.

The system 400 is capable of receiving time updates on a time update receiver 435 from a remote time source 440. However, in some embodiments, the system 400 functions without receiving time updates from a remote time source 440. The system 400 further includes a primary power supply 445. Primary power supply 445 provides power to the subsystems of machine 403 to allow it to function. Although certain subsystems are pictured in FIG. 4, the machine 403 can include additional subsystems that serve various purposes. Additional subsystems may include sensors and/or devices that measure and/or determine torque, weight, vibration, temperature, motor position, speed, acceleration, fluid levels, pressure, flow rates, and whether solenoids are enabled.

Figure 5:
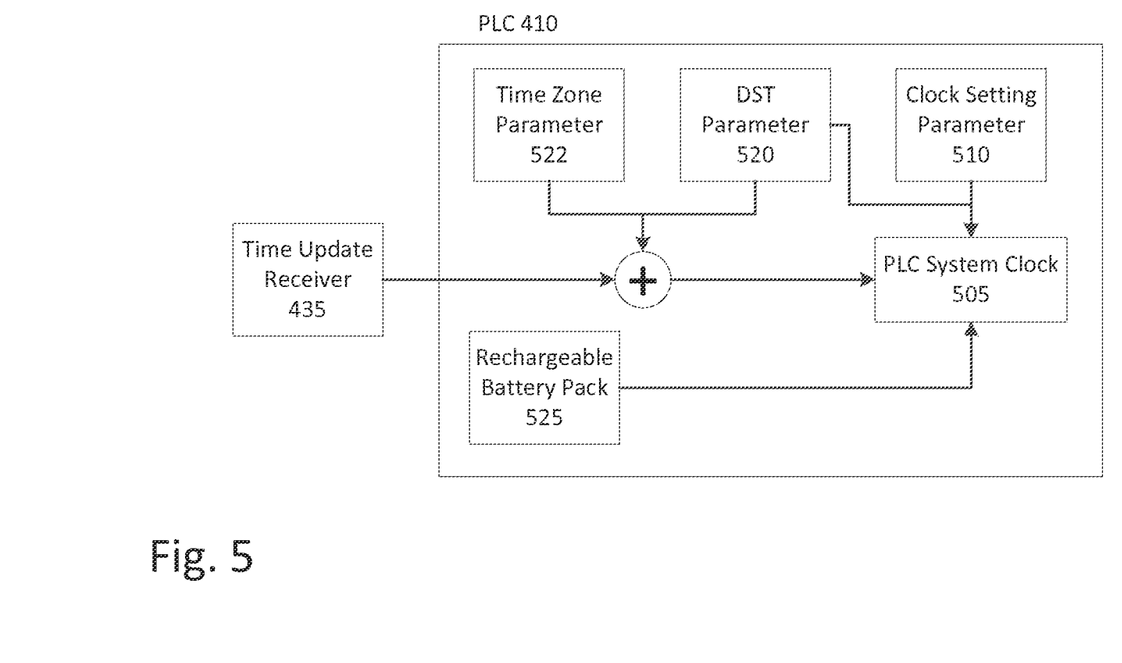
FIG. 5 illustrates a programmable logic controller (PLC) of the system of FIG. 4.

FIG. 5 illustrates the PLC 410 of system 400. The PLC 410 includes a PLC system clock 505, a clock setting parameter 510, a Daylight Saving Time (DST) parameter 520, and a time zone parameter 522. The PLC system clock 505 may include a combination of hardware and software used in conjunction with a crystal oscillator to keep time. The clock setting parameter 510 allows qualified maintenance personnel to set and adjust the PLC system clock 505. For example, qualified maintenance personnel can enter a local time (e.g., 3:45 p.m.) into clock setting parameter 510 and the PLC system clock 505 will run according to the entered time. DST parameter 520 and time zone parameter 522 can be used to calculate a local time of the machine 403 when the PLC 410 receives a time update from the time update receiver 435. For example, if the PLC 410 receives a Coordinated Universal Time (UTC) value, parameters 520 and 522 can be used to calculate the local time of the machine 403. Additionally, DST parameter 520 can be used to update the PLC system clock 505 properly when DST is in effect. Thus, DST parameter 520 can adjust the PLC system clock 505 without the PLC 410 receiving time updates as well as in embodiments where the remote time source 440 is not used.

The PLC 410 also includes a rechargeable battery pack 525 to allow the PLC system clock 505 to continue running for several months or longer even when the primary power supply 445 of machine 403 is unavailable or turned off. Accordingly, the rechargeable battery pack 525 provides backup power to the PLC. In some embodiments, the rechargeable battery pack 525 is located external to the PLC 410 and can provide backup power to other subsystems. In embodiments that use a remote time source 440 to update the PLC system clock 505, the rechargeable battery pack 525 may allow for parameters 520 and 522 to be maintained in memory when primary power supply 445 is unavailable or off. Alternatively, the parameters 520 and 522 may be stored in a nonvolatile memory.

Figure 6:
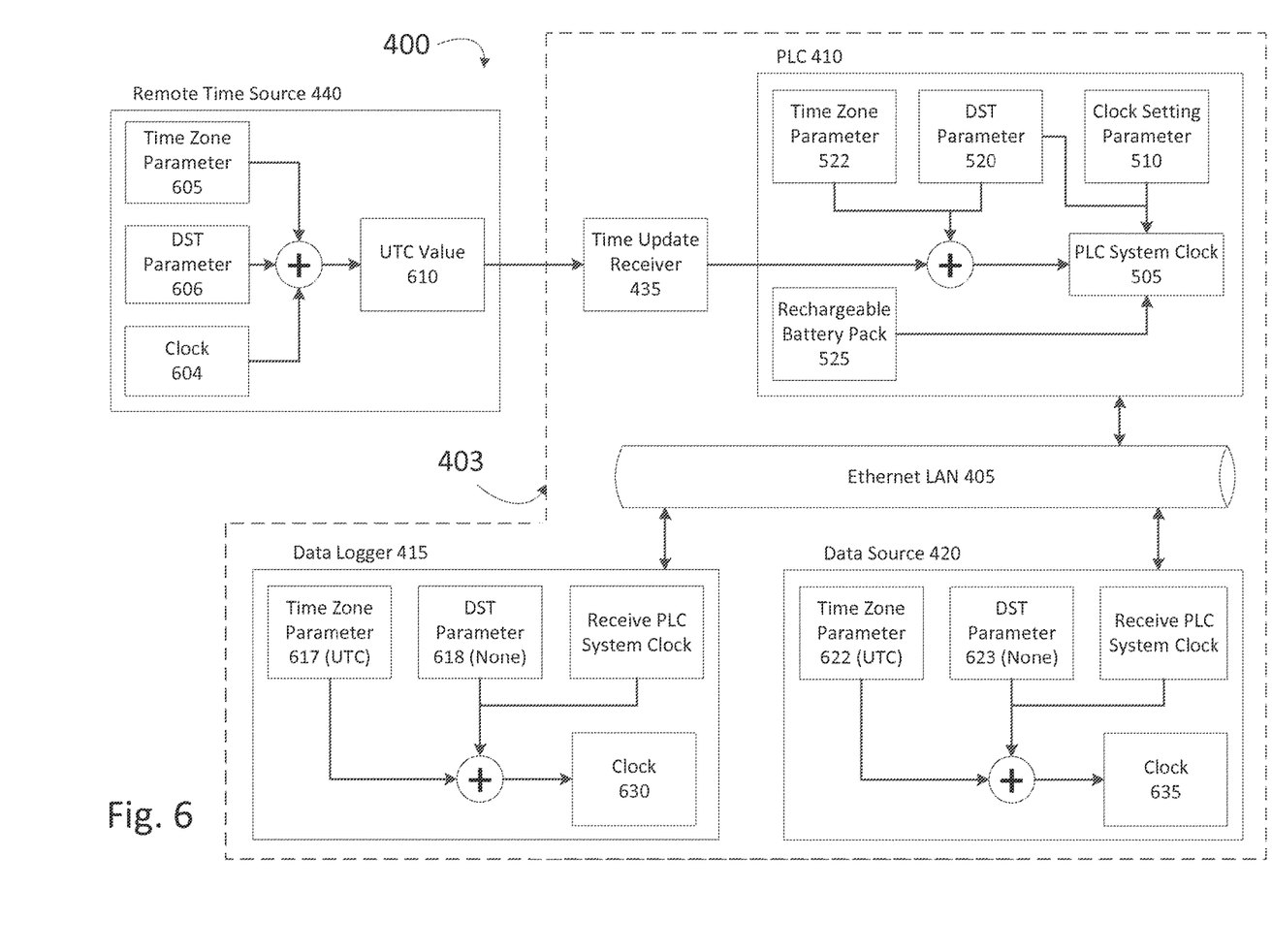
FIG. 6 illustrates a system that synchronizes the clocks of numerous subsystems on a mining machine by using the PLC's clock as a master clock.

FIG. 6 illustrates a more detailed diagram of the system 400 that synchronizes the clocks of numerous subsystems on a machine 403 by using the PLC system clock 505 as a master clock. Data logger 415 includes a data logger clock 630. Data source 420 includes a data source clock 635. The clocks 630 and 635 of the subsystems can be used to time stamp data.

Each subsystem also includes its own time zone parameter and DST parameter. The data logger 415 includes a data logger time zone parameter 617 and a data logger DST parameter 618. The data source 420 includes a data source time zone parameter 622 and a data source DST parameter 623. The maintenance computer 425 and machine operator computer 430 of system 400 are not pictured in FIG. 6 but have similar configurations as those of data logger 415 and data source 420.

The DST parameters can include a DST setting parameter and a DST on/off parameter. The DST setting parameter is a binary parameter that is set to either standard time (e.g., during winter months) or daylight saving time (e.g., during summer months). The DST on/off parameter controls whether the DST setting parameter influences calculations of local time. Stated another way, the DST on/off parameter controls whether a subsystem uses its DST setting parameter to calculate local time. Thus, the DST on/off parameter enables or disables the DST setting parameter, while the DST setting parameter indicates whether a DST offset is taken into account in local time calculations based on the current time of year. Accordingly, a DST parameter may be effectively disabled or ignored in time calculations by either setting the DST on/off parameter to "off" or, when the DST on/off parameter is "on," by setting the DST setting parameter to standard time, rather than DST time.

The data logger 415 receives data that was time stamped by the subsystem that collected the data. Additionally, the data logger 415 time stamps data when data is received. The data logger 415 can compare its own time stamp with the time stamp generated by the subsystem. If the time stamps are not within a specified range, the data is assumed to be corrupt and is discarded. Furthermore, the data logger 415 can compare the time stamps for data generated by multiple subsystems in order to synchronize data collected from multiple sources on the machine 403. Thus, synchronization of subsystem clocks on the machine enables accurate data collections and prevents data from being discarded.

The system 400 reduces and may eliminate loss of data due to lack of time synchronization between subsystems on the machine 403. The system 400 uses the PLC system clock 505 as the master clock for subsystems on the machine 403.

The subsystems of machine 403 are Simple Network Time Protocol (SNTP) clients that periodically request time updates, which are handled by software on the PLC 410. SNTP clients expect to receive a UTC value in response to their time update requests. However, the PLC 410 responds to time update requests by sending the local time of the machine 403. Thus, the local time is masked as the UTC value. Stated another way, the SNTP clients periodically request UTC time, and receive a local time of the PLC 410 masked as the UTC time.

Accordingly, the time zone parameters of each subsystem, including time zone parameters 617 and 622, assume that the machine 403 is in the UTC time zone even though the machine is not located in the UTC time zone. That is, the time zone parameters are set to the UTC time zone. Thus, when subsystems receive updated times from the PLC 410 after requesting a time update, the time received will not be adjusted based on the time zone parameters 617 and 622. Additionally, the DST parameters 618 and 623 of each subsystem are disabled such that DST is ignored. Thus, the time received by each subsystem from the PLC 410 will not be adjusted based on the DST parameters 618 and 622. Accordingly, the time received by each subsystem from the PLC 410 is not adjusted by that subsystem and will become the local time of each subsystem.

In some embodiments, remote time source 440 provides a time that the PLC 410 can use to synchronize its clock. Remote time source 440 is a SNTP server with a clock 604, a time zone parameter 605, and a DST parameter 606. The clock 604 keeps the local time of the remote time source 440. Parameters 605 and 606 are used to calculate UTC value 610 based on the local time provided by the clock 604. Alternatively, remote time source 440 is another type of remote time source that does not use SNTP. In some instances the PLC 410 sends a time update request to the remote time source 440 (e.g., periodically), and the remote time source 440 sends a time (e.g., UTC time) to the time update receiver 435. Alternatively, the remote time source 435 may periodically send time updates to the time update receiver 435 without receiving a time update request from the PLC 410. In some embodiments, the PLC clock 505 cannot update its time from a remote time source 440. Rather, the PLC clock 505 is set initially and updated as needed via the maintenance computer 425. In some embodiments, the time update receiver is part of the PLC 410 and/or located within the PLC 410.

The system 400 enables the local time of subsystems to be adjusted by altering the clock setting parameter 510 and/or DST parameter 520 on the PLC 410. The individual settings of each subsystem do not need to be altered to update the local time of each subsystem. Furthermore, even if the settings on the PLC 410 are incorrect (due to recent time zone or DST changes), subsystems on the machine 403 will remain synchronized with each other. Thus, data is not lost due to inconsistent time stamps.

Additionally, the system 400 eliminates DST errors made by subsystems due to inability to retain knowledge that DST parameters were already updated. Subsystems do not add or subtract an hour each time they reboot because the DST parameters 618 and 623 of each subsystem are disabled such that DST is ignored. Furthermore, using the PLC system clock 505 as the synchronization source for subsystems instead of a SNTP server eliminates SNTP server functionality and accuracy issues. The behavior of the PLC system clock 505 is more accurate and more easily controlled than typical SNTP servers.

Figure 7:
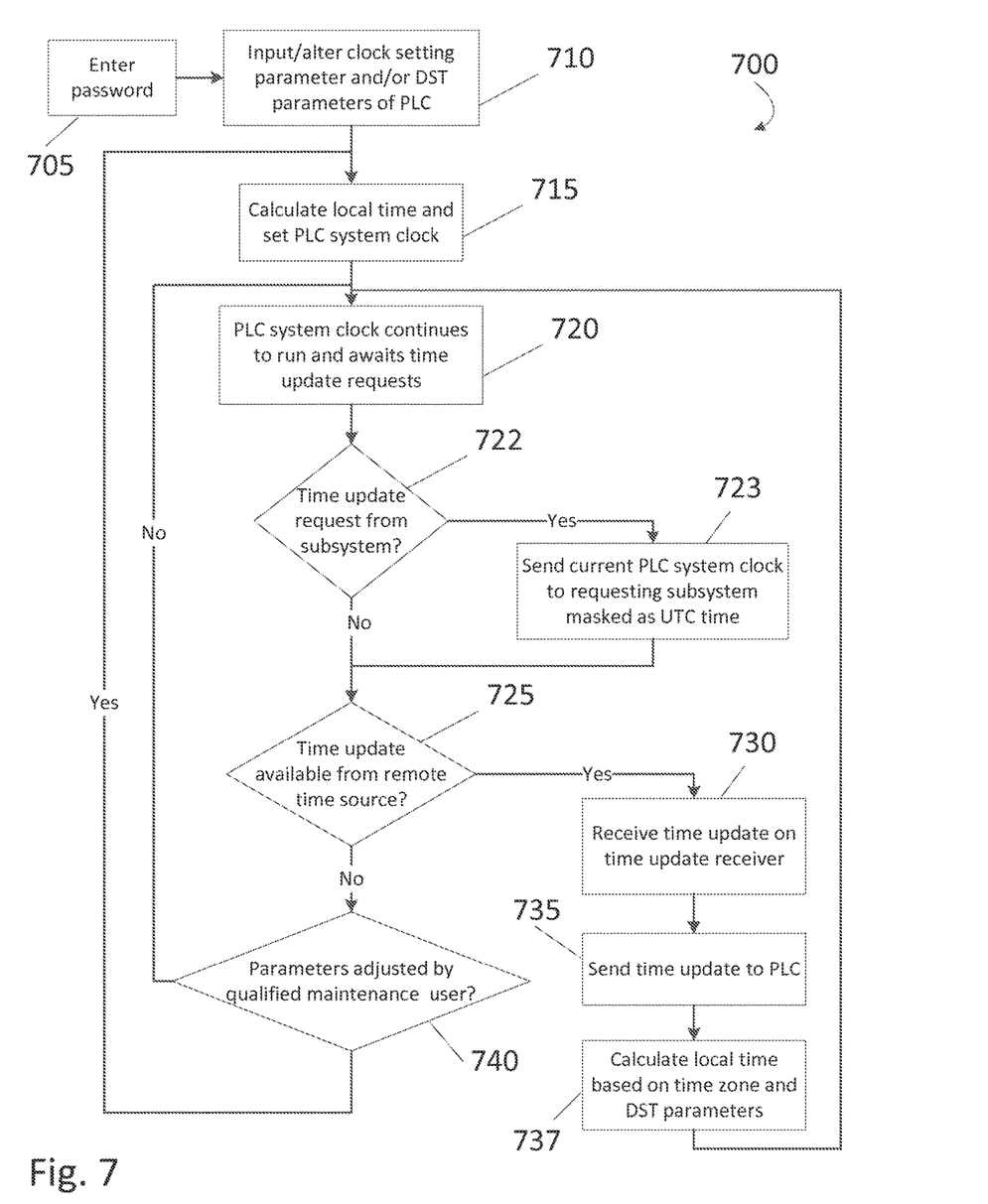
FIG. 7 illustrates a block diagram of the process executed by the system of FIG. 6 to synchronize the clocks of the subsystems of the mining machine.

FIG. 7 illustrates a block diagram of a process 700 executed by system 400 to synchronize the clocks of the subsystems of machine 403. At step 705, qualified maintenance personnel can enter a password to gain access to adjust parameters of the system 400. After gaining access, the qualified maintenance personnel can input the clock setting parameter 510, DST parameter 520, and time zone parameter 522 of the PLC 410 (step 710). The system 400 calculates the local time of the machine 403 based on the entered parameters 510 and 520 (step 715). The PLC system clock 505 is set to the calculated local time. In some instances, such as when the parameters are initially entered, the system 400 does not make calculations at step 715 and instead sets the PLC system clock 505 to the local time that was entered as the clock setting parameter 510. The PLC system clock 505 continuously runs and awaits time update requests from subsystems (step 720). The PLC system clock acts as the SNTP server for the subsystems of the machine 403. If the PLC 410 receives a time update request (i.e., a UTC time request) from one or more subsystems (step 722), the PLC sends the current PLC system clock to the requesting subsystem(s) masked as a UTC time (step 723).

If a time update is available from a remote time source (step 725), a time update receiver 435 receives the time update (step 730). In some embodiments the time update is received using SNTP from an SNTP server, and the time update receiver 435 sends the time update to the PLC 410 using a second communication protocol (step 735). The PLC 410 then calculates the updated time for the PLC system clock 505 using the time update, the PLC DST parameter 520, and the PLC time zone parameter 522 (step 737). In some embodiments, the remote time source 440 is an SNTP server. In alternate embodiments, the remote time source 440 does not utilize SNTP. In some embodiments, the PLC system clock 505 runs based on the parameters 510 and 520 and a locally provided time, and is configured not to update from a remote time source 440. Stated another way, the PLC system clock 505 runs independent of a remote time source 440.

If qualified maintenance personnel alter the parameters 510 and 520 of the system 400 (step 740), the system 400 adjusts the PLC system clock 505 using the updated parameters 510 and 520 (step 715). Thus, the clocks of the subsystems on the machine 403 can be updated by altering the parameters 510 and 520 of the PLC 410.

Thus, embodiments of the invention provide, among other things, systems and methods for synchronizing time between multiple systems on an industrial machine, such as a mining machine. The systems and methods utilize a PLC system clock as a master clock for subsystems on the machine. Thus, the systems and methods allow for changes in time zone and DST information for subsystems on the machine to be easily adjusted from a single source (e.g., the PLC). The systems and methods further ensure that the various clocks on the machine are synchronized even if time zone and/or DST parameters of the PLC are not up-to-date.

Various features of the invention are set forth in the following claims.

What is claimed is:

1. An industrial machine comprising:
  a programmable logic controller (PLC) including a PLC system clock having set at least one selected from the group consisting of a Daylight Saving Time (DST) parameter, a clock setting parameter, and a time zone parameter and having a local time, the local time being a time of an area in which the industrial machine is located, the area being outside of the Coordinated Universal Time (UTC) time zone, the PLC operable to control an industrial function of the industrial machine, calculate the local time of the industrial machine based on the at least one selected from the group consisting of the DST parameter, the clock setting parameter, and the time zone parameter, and transmit the local time masked as a UTC time value; and
  a computer subsystem having a local time clock with a configurable time zone parameter that is set to the UTC time zone and a DST parameter that is disabled, the computer subsystem receiving the local time transmitted by the PLC and the local time clock being set to the received local time from the PLC.

2. The industrial machine of claim 1, further comprising a primary power supply that provides power to the machine, wherein the PLC further includes a battery pack providing backup power to the PLC system clock when the primary power supply is off.

3. The industrial machine of claim 1, further comprising a maintenance computer, wherein the at least one selected from the group consisting of the clock setting parameter of the PLC, the DST parameter of the PLC, and the time zone parameter of the PLC are adjusted after receiving a password by the maintenance computer.

4. The industrial machine of claim 3, wherein the PLC system clock is configured to update based on adjustments made to the at least one selected from the group consisting of the clock setting parameter of the PLC, the DST parameter of the PLC, and the time zone parameter of the PLC.

5. The industrial machine of claim 1, further comprising a time update receiver configured to receive time updates from a remote time source using Simple Network Time Protocol (SNTP), wherein the time update receiver is further configured to send the time updates to the PLC.

6. The industrial machine of claim 5, wherein the PLC calculates the local time of the industrial machine based on the time update, the DST parameter of the PLC and the time zone parameter of the PLC.

7. The industrial machine of claim 1, wherein the system operates independent of a remote time source.

8. The industrial machine of claim 1, wherein DST amnesia is mitigated on the industrial machine.

9. A method of synchronizing time between multiple systems on an industrial machine, the method comprising:
  setting a programmable logic controller (PLC) system clock of a PLC to a local time, the local time being a time of an area in which the industrial machine is located, the area being outside of the Coordinated Universal Time (UTC) time zone;
  setting at least one selected from the group consisting of a Daylight Saving Time (DST) parameter of the PLC, a clock setting parameter of the PLC, and a time zone parameter of the PLC;
  calculating the local time of the industrial machine based on the at least one selected from the group consisting of the DST parameter of the PLC, the clock setting parameter of the PLC, and the time zone parameter of the PLC;
  setting a time zone parameter of a computer subsystem of the industrial machine to the UTC time zone;
  disabling a DST parameter of the computer subsystem to ignore DST;
  receiving, by the PLC, a UTC time update request from the computer subsystem;
  sending a current time value of the PLC system clock to the computer subsystem masked as a UTC time value in response to receiving the UTC time update request; and
  setting a clock of the computer subsystem to the current time value of the PLC system clock.

10. The method of claim 9, further comprising updating the PLC system clock based on adjustments made to the at least one selected from the group consisting of the DST parameter of the PLC, the clock setting parameter of the PLC, and the time zone parameter of the PLC.

11. The method of claim 9, further comprising updating the PLC system clock based on a time update from a remote time source.

12. The method of claim 9, further comprising:
receiving, at a time update receiver, a time update from a Simple Network Time Protocol (SNTP) server;
sending the time update to the PLC; and
calculating the local time of the industrial machine based on the time update, the DST parameter of the PLC, and the time zone parameter of the PLC.

13. The method of claim 9, further comprising providing backup power to the PLC system clock by a battery pack when a primary power supply of the industrial machine is off.

14. The method of claim 10, further comprising:
receiving a password, by a maintenance computer; and
after confirming the password, receiving adjustments to the at least one selected from the group consisting of the DST parameter of the PLC, the clock setting parameter of the PLC, and the time zone parameter of the PLC.

15. The method of claim 9, further comprising setting and updating the PLC system clock independent of a remote time source.

16. The method of claim 9, wherein DST amnesia is mitigated on the industrial machine.

* * * * *